United States Patent
Chuang

(10) Patent No.: US 10,098,001 B2
(45) Date of Patent: Oct. 9, 2018

(54) METHOD AND COMMUNICATIONS DEVICE FOR DYNAMICALLY ALLOCATING RESOURCES

(71) Applicant: Acer Incorporated, New Taipei (TW)

(72) Inventor: Ming-Dao Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/441,337

(22) Filed: Feb. 24, 2017

(65) Prior Publication Data

US 2018/0176785 A1 Jun. 21, 2018

(30) Foreign Application Priority Data

Dec. 19, 2016 (TW) .............. 105142023 A

(51) Int. Cl.
*H04W 16/10* (2009.01)
*H04W 64/00* (2009.01)

(52) U.S. Cl.
CPC ........... *H04W 16/10* (2013.01); *H04W 64/00* (2013.01)

(58) Field of Classification Search
CPC .............................. H04W 16/10; H04W 64/00
See application file for complete search history.

(56) References Cited

U.S. PATENT DOCUMENTS

| | | |
|---|---|---|
| 2008/0219213 A1 | 9/2008 | Natarajan et al. |
| 2011/0070911 A1* | 3/2011 | Zhang ............... H04W 16/02 455/509 |
| 2012/0307750 A1 | 12/2012 | Hunukumbure et al. |

OTHER PUBLICATIONS

Chinese language office action dated Sep. 17, 2017, issued in application No. TW 15142023.

* cited by examiner

*Primary Examiner* — Chuong A Ngo
(74) *Attorney, Agent, or Firm* — McClure, Qualey & Rodack, LLP

(57) ABSTRACT

A method for dynamically allocating resources is disclosed. The method is used in a base station and includes: dividing a coverage zone into a plurality of geographic zones, wherein each geographic zone corresponds to a resource pool; finding a first geographic zone based on geographic location information, wherein a resource utilization rate of resource blocks in a first resource pool corresponding to the first geographic zone is highest; determining whether resource pools corresponding to a plurality of adjacent geographic zones of the first geographic zone are reused; and allocating the resource blocks in the resource pools corresponding to the adjacent geographic zones to the first resource pool.

16 Claims, 12 Drawing Sheets

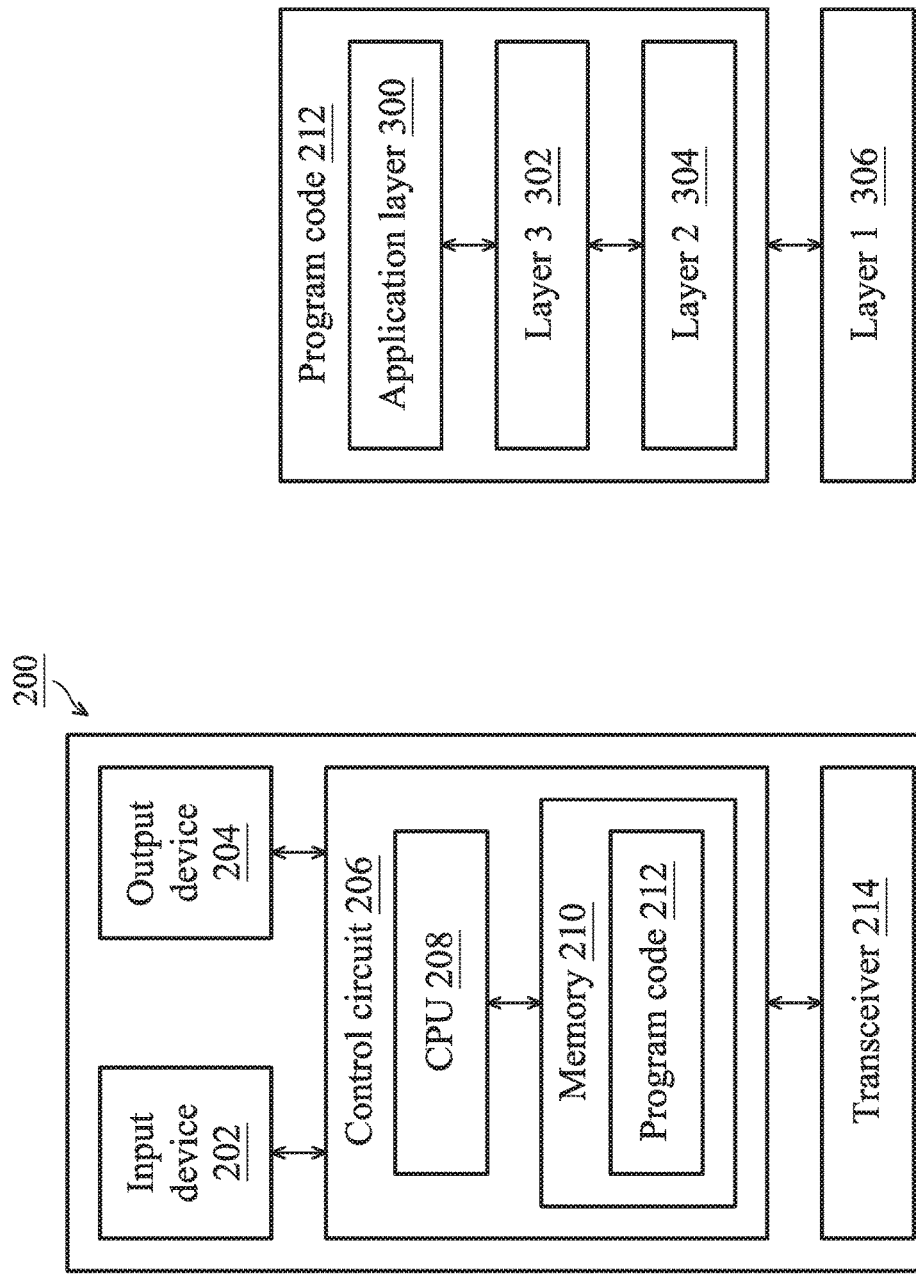

METHOD AND COMMUNICATIONS DEVICE FOR DYNAMICALLY ALLOCATING RESOURCES

CROSS REFERENCE TO RELATED APPLICATIONS

This Application claims priority of Taiwan Patent Application No. 105142023, filed on Dec. 19, 2016, the entirety of which is incorporated by reference herein.

BACKGROUND OF THE INVENTION

Field of the Invention

Aspects of the present disclosure relate generally to a wireless communications network, and more particularly, to a method and a communications device for dynamically allocating resources based on a Vehicle to Vehicle (V2V) communication technology in wireless communications systems.

Description of the Related Art

Recently, V2X (Vehicle to Everything) communication has been developed. The V2X communication includes Vehicle-to-Vehicle (V2V) communication, Vehicle-to-Device (V2D) communication, Vehicle-to-Infrastructure (V2I) communication, and Vehicle-to-Nomadic (V2N) device communication.

The V2X communication forms a network using vehicle-to-vehicle communication, vehicle-to-infrastructure communication, and vehicle-to-nomadic device communication, and transmits/receives various pieces of information through the network so that traffic information, route guidance, various multimedia content, etc. are shared in order to perform various functions, such as ensuring traffic safety and preventing traffic congestion.

In the V2X system, all mobile devices (in vehicles, pedestrian, road side unit (RSU), etc.) basically share the same physical radio channel for transmitting/receiving V2X message. It is common to configure and provide multiple resource pools to be used in a manner in which co-channel interference can be mitigated, so that user equipments (UE) in one proximity zone share a particular resource pool, while the other UEs in adjacent zones use different resource pools from this pool. In this way, the V2X messages transmitted by the adjacent zone are not in direct conflict with the V2X messages generated locally, thereby reducing the near-far problems.

However, when a large number of UEs appear in the same zone at a specific time, the resource utilization rate of resource blocks (RBs) in the resource pool corresponding to this zone may be too high. Thus, it is necessary to find a method and a communications device for dynamically allocating resources to avoid the problem described above.

BRIEF SUMMARY OF THE INVENTION

The following summary is illustrative only and is not intended to be limiting in any way. That is, the following summary is provided to introduce concepts, highlights, benefits, and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method and a communications device for dynamically allocating resources are provided.

In a preferred embodiment, the disclosure is directed to a method for dynamically allocating resources, used in a base station, comprising: dividing a coverage zone into a plurality of geographic zones, wherein each geographic zone corresponds to a resource pool; finding a first geographic zone based on geographic location information, wherein a resource utilization rate of resource blocks in a first resource pool corresponding to the first geographic zone is highest; determining whether resource pools corresponding to a plurality of adjacent geographic zones of the first geographic zone are reused; and allocating the resource blocks in the resource pools corresponding to the adjacent geographic zones to the first resource pool according to a determination result.

In some embodiments, when the determination result indicates that the resource pools corresponding to the adjacent geographic zones of the first geographic zone are not reused, the step of allocating the resource blocks further comprises: finding a second geographic zone from the adjacent geographic zones according to the geographic location information, wherein a resource utilization rate of resource blocks in a second resource pool corresponding to the second geographic zone is lowest; and allocating a portion of the resource blocks in the second resource pool to the first resource pool. In some embodiments, when the determination result indicates that the resource pools corresponding to the adjacent geographic zones of the first geographic zone are not reused, the step of allocating the resource blocks further comprises: allocating a portion of the resource blocks in each resource pool corresponding to the adjacent geographic zones to the first resource pool. In some embodiments, when the determination result indicates that the resource pools corresponding to the adjacent geographic zones of the first geographic zone are not reused, the step of allocating the resource blocks further comprises: finding a second geographic zone from the adjacent geographic zones according to the geographic location information, wherein a resource utilization rate of resource blocks in a second resource pool corresponding to the second geographic zone is lowest; and merging the second resource pool into the first resource pool. In some embodiments, when the determination result indicates that the resource pools corresponding to the adjacent geographic zones of the first geographic zone are reused, the step of allocating the resource blocks further comprises: finding all geographic zones corresponding to a third resource pool from the adjacent geographic zones according to the geographic location information, wherein a resource utilization rate of resource blocks in the third resource pool is lowest; and allocating a portion of the resource blocks in the third resource pool to the first resource pool. In some embodiments, when the determination result indicates that the resource pools corresponding to the adjacent geographic zones of the first geographic zone are reused, the step of allocating the resource blocks further comprises: allocating a portion of the resource blocks in each resource pool corresponding to the adjacent geographic zones to the first resource pool. In some embodiments, the geographic location information comprises at least one of the following: geographic locations and current geographic zones reported by a plurality of user equipments (UEs) in the coverage zone, a special time and place preset by the base station and a particular message transmitted by a particular UE in the coverage zone. In some embodiments, each geographic zone does not share the same resource pool with respective adjacent geographic zones. In some embodiments, each geographic zone has a respective length and width.

In a preferred embodiment, the disclosure is directed to a communications device for dynamically allocating resources. The communications device comprises: a control circuit, a processor and a memory. The processor is installed in the control circuit. The memory is installed in the control circuit and is operatively coupled to the processor. The processor is configured to execute program code stored in the memory to perform operations comprising: dividing a coverage zone into a plurality of geographic zones, wherein each geographic zone corresponds to a resource pool; finding a first geographic zone based on geographic location information, wherein a resource utilization rate of resource blocks in a first resource pool corresponding to the first geographic zone is highest; determining whether resource pools corresponding to a plurality of adjacent geographic zones of the first geographic zone are reused; and allocating the resource blocks in the resource pools corresponding to the adjacent geographic zones to the first resource pool according to a determination result.

In some embodiments, when the determination result indicates that the resource pools corresponding to the adjacent geographic zones of the first geographic zone are not reused, the processor further executes the program code to perform operations comprising: finding a second geographic zone from the adjacent geographic zones according to the geographic location information, wherein a resource utilization rate of resource blocks in a second resource pool corresponding to the second geographic zone is lowest; and allocating a portion of the resource blocks in the second resource pool to the first resource pool. In some embodiments, when the determination result indicates that the resource pools corresponding to the adjacent geographic zones of the first geographic zone are not reused, the processor further executes the program code to perform operations comprising: allocating a portion of the resource blocks in each resource pool corresponding to the adjacent geographic zones to the first resource pool. In some embodiments, when the determination result indicates that the resource pools corresponding to the adjacent geographic zones of the first geographic zone are not reused, the processor further executes the program code to perform operations comprising: finding a second geographic zone from the adjacent geographic zones according to the geographic location information, wherein a resource utilization rate of resource blocks in a second resource pool corresponding to the second geographic zone is lowest; and merging the second resource pool into the first resource pool. In some embodiments, when the determination result indicates that the resource pools corresponding to the adjacent geographic zones of the first geographic zone are reused, the processor further executes the program code to perform operations comprising: finding all geographic zones corresponding to a third resource pool from the adjacent geographic zones according to the geographic location information, wherein a resource utilization rate of resource blocks in the third resource pool is lowest; and allocating a portion of the resource blocks in the third resource pool to the first resource pool. In some embodiments, when the determination result indicates that the resource pools corresponding to the adjacent geographic zones of the first geographic zone are reused, the processor further executes the program code to perform operations comprising: allocating a portion of the resource blocks in each resource pool corresponding to the adjacent geographic zones to the first resource pool. In some embodiments, the geographic location information comprises at least one of the following: geographic locations and current geographic zones reported by a plurality of user equipments (UEs) in the coverage zone, a special time and place preset by the base station, and a particular message transmitted by a particular UE in the coverage zone. In some embodiments, each geographic zone does not share the same resource pool with respective adjacent geographic zones. In some embodiments, each geographic zone has a respective length and width.

A detailed description is given in the following embodiments with reference to the accompanying drawings.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

FIG. 2 shows an alternative simplified functional block diagram of a communications device according to one embodiment of the present disclosure.

FIG. 3 is a simplified block diagram of the program code shown in FIG. 2 in accordance with one embodiment of the disclosure.

DETAILED DESCRIPTION OF THE INVENTION

Figure 1:
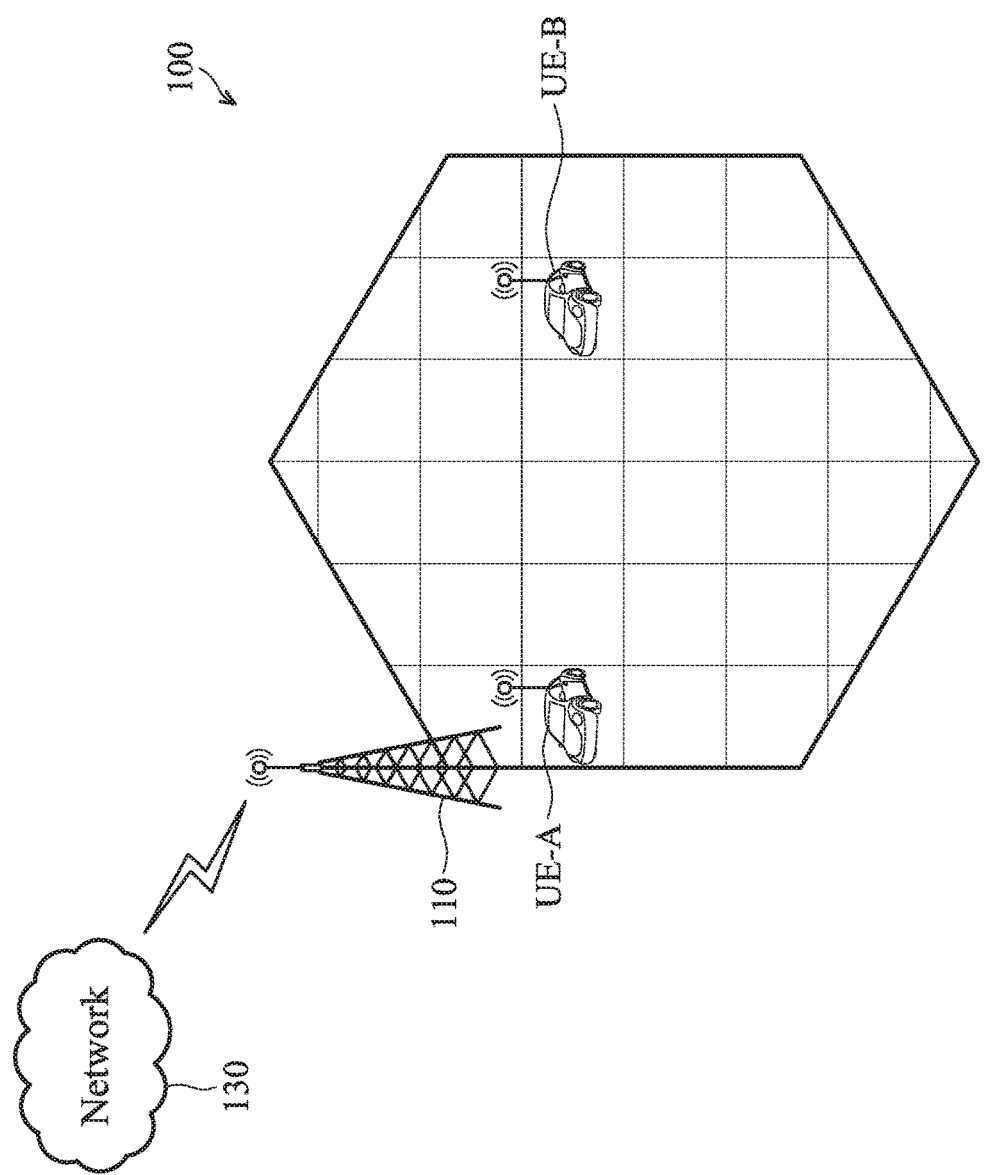
FIG. 1 illustrates an example of a wireless communications system according to embodiments of the present disclosure.

Several exemplary embodiments of the present disclosure are described with reference to FIGS. 1 through 7D, which generally relate to a method and a communications device for dynamically allocating resources. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

It should be understood that the term "vehicle" or "vehicular" or other similar terms used herein are inclusive of motor vehicles in general such as passenger automobiles including sports utility vehicles (SUV), buses, trucks, various commercial vehicles, watercraft including a variety of boats and ships, aircraft, and the like, and includes hybrid vehicles, plug-in hybrid electric vehicles, hydrogen-powered vehicles and other alternative-fuel vehicles (e.g., fuels derived from resources other than petroleum). As referred to herein, a hybrid vehicle is a vehicle that has two or more sources of power, for example gasoline and electric.

The descriptions of FIGS. 1-2 are not meant to imply physical or architectural limitations to the manner in which different embodiments may be implemented. Different embodiments of the present disclosure may be implemented in any suitably-arranged communications system.

FIG. 1 illustrates an example of a wireless communications system 100 according to embodiments of the present disclosure. The embodiment of the wireless communications system 100 shown in FIG. 1 is for illustration only. Other embodiments of the wireless communications system 100 could be used without departing from the scope of this disclosure.

As shown in FIG. 1, the wireless communications system 100 includes a base station 110. The base station 110 communicates with at least one network 130, such as the Internet, a proprietary Internet Protocol (IP) network, or another data network.

The base station 110 provides wireless access to the network 130 for UE-A and UE-B within a coverage zone 112 of the base station 110. The base station 110 may communicate with each other and with UE-A and UE-B by using 5G, LTE, LTE-A, WiMAX, Wi-Fi, LTE-U (LAA), device-to-device (D2D) communication, vehicle-to-Everything (V2X) communication, such as vehicle-to-device (V2D), vehicle-to-infrastructure (V2I), vehicle-to-vehicle (V2V), or another wireless communication technique. In one embodiment, the base station 110 may be implemented as managing entities that control UE-A and UE-B (such as vehicle terminals).

Depending on the network type, other well-known terms may be used instead of "base station", such as "eNodeB", "eNB", "managing entity", "managing network entity", or "access point." For the sake of convenience, the terms "base station" are used in the present disclosure to refer to network infrastructure components that provide wireless access to remote terminals. Also, depending on the network type, other well-known terms may be used instead of "user equipment" or "UE", such as "mobile station," "subscriber station", "remote terminal", "wireless terminal," "vehicle" or "user device." For the sake of convenience, the terms "user equipment" and "UE" are used in the present disclosure to refer to remote wireless equipment that wirelessly accesses a base station (such as eNB).

FIG. 2 shows an alternative simplified functional block diagram of a communications device 200 according to one embodiment of the present disclosure. As shown in FIG. 2, the communications device 200 can be UE-A, UE-B, or the base station 110 in the wireless communications system 100 of FIG. 1, and the communications device 200 is preferably used in the LTE system, the LTE-A system or any other similar wireless communications system. The communications device 200 may include an input device 202, an output device 204, a control circuit 206, a central processing unit (CPU) 208, a memory 210, program code 212, and a transceiver 214. The control circuit 206 executes the program code 212 in the memory 210 through the CPU 208, thereby controlling the operation of the communications device 200. The communications device 200 can receive signals input by a user through the input device 202, such as a keyboard keypad, touch screen, or microphone (for voice input), and can output images and sounds through the output device 204, such as a screen or speakers. The transceiver 214 is used to receive and transmit wireless signals, deliver received signals to the control circuit 206, and output signals generated by the control circuit 206 wirelessly.

FIG. 3 is a simplified block diagram of the program code 212 shown in FIG. 2 in accordance with one embodiment of the disclosure. In this embodiment, the program code 212 includes an application layer 300, a Layer 3 302, and a Layer 2 304, and is coupled to a Layer 1 306. The application layer 300 performs signaling/data/media information exchange via user plane messages, i.e. it is required that the UE has IP connectivity with the network. Layer 3 302 generally performs mobility management, e.g. the mobility management entity (MME) and the UE use NAS messages to exchange location information and attachment status, etc. Layer 2 304 generally performs radio resource control and link control. Layer 1 306 generally performs physical connections.

Figures 4A, 4B:
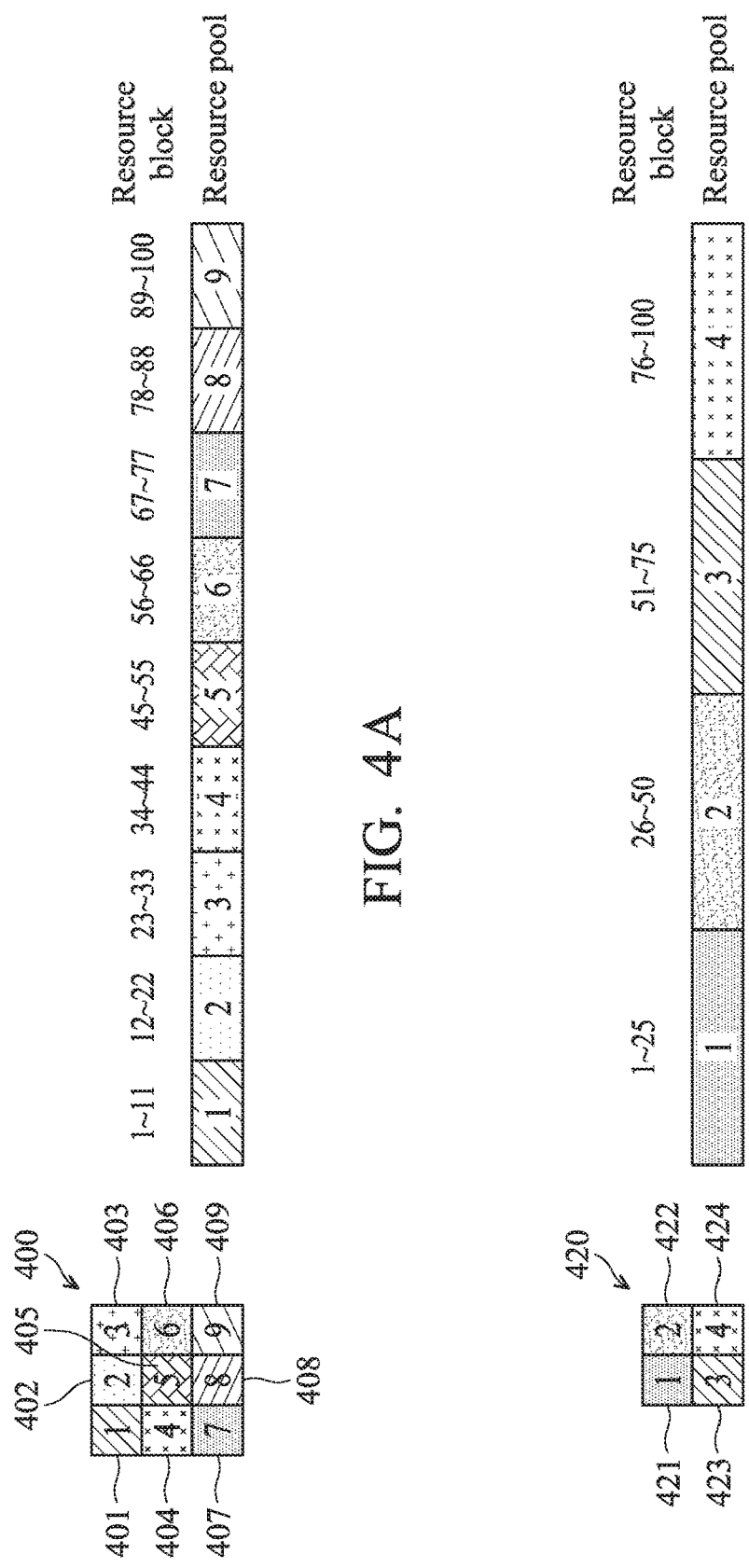
FIGS. 4A-4B are illustrations of coverage zones divided into a plurality of geographic zones in accordance with an embodiment of the disclosure

FIGS. 4A-4B are illustrations of coverage zones 400 and 420 divided into a plurality of geographic zones in accordance with an embodiment of the disclosure. The physical world may be mapped to a 2-D space fully divided into non-overlapping rectangular zones. In the embodiment, the base station can divide the coverage zones 400 and 420 into a plurality of non-overlapping rectangular geographic zones, wherein each geographic zone has a width and length, and the width and length can be preconfigured by the base station. In an embodiment, the width and length of each geographic zone can be 5, 10, 20, 50, 100, 200 or 500 meters. Each geographic zone has a zone ID can correspond to a resource pool. The zone IDs may be reused and the same zone ID corresponds to the same resource pool. The adjacent geographic zones do not share the same zone ID. In other words, each geographic zone does not share the same resource pool with its adjacent geographic zones. The total number of zone IDs of the geographic zones corresponds to the total number of resource pools.

For example, in FIG. 4A, the base station may divide the coverage area 400 into 9 geographic zones 401 to 409 whose zone IDs are 1 to 9, respectively. The base station further allocates the resource blocks 1 to 100 to the resource pools 1 to 9 corresponding to the geographic zones 401 to 409 in advance. In this example, each of the resource pools 1 to 8 corresponding to the geographic zones whose zone IDs are 1 to 8 has 11 resource blocks, and the resource pool 9 corresponding to the geographic zone whose zone ID is 9 has 12 resource zones. For example, the resource pool 1 corresponding to the geographic zone whose zone ID is 1 has the resource blocks 1 to 11, and the resource pool 9 corresponding to the geographic zone whose zone ID is 9 has the resource blocks 89 to 100. It should be understood that the base station may allocate a different number of resource blocks to different resource pools, not as much as the present disclosure in advance, and it should not be limited to the disclosure.

In FIG. 4B, the base station may divide the coverage area 420 into 4 geographic zones 421 to 424 whose zone IDs are 1 to 4, respectively. The base station further allocates the resource blocks 1 to 100 to the resource pools 1 to 4 corresponding to the geographic zones 421 to 424 in advance. In this example, each of the resource pools 1 to 4 corresponding to the geographic zones whose zone IDs are 1 to 4 has 25 resource blocks. For example, the resource pool 1 corresponding to the geographic zone whose zone ID is 1 has resource blocks 1 to 25, and the resource pool 4 corresponding to the geographic zone whose zone ID is 4 has resource blocks 76 to 100. It should be understood that the base station may allocate a different number of resource blocks to different resource pools in advance; for example, not as many as in the present disclosure, and it should not be limited to the disclosure.

Figure 5:
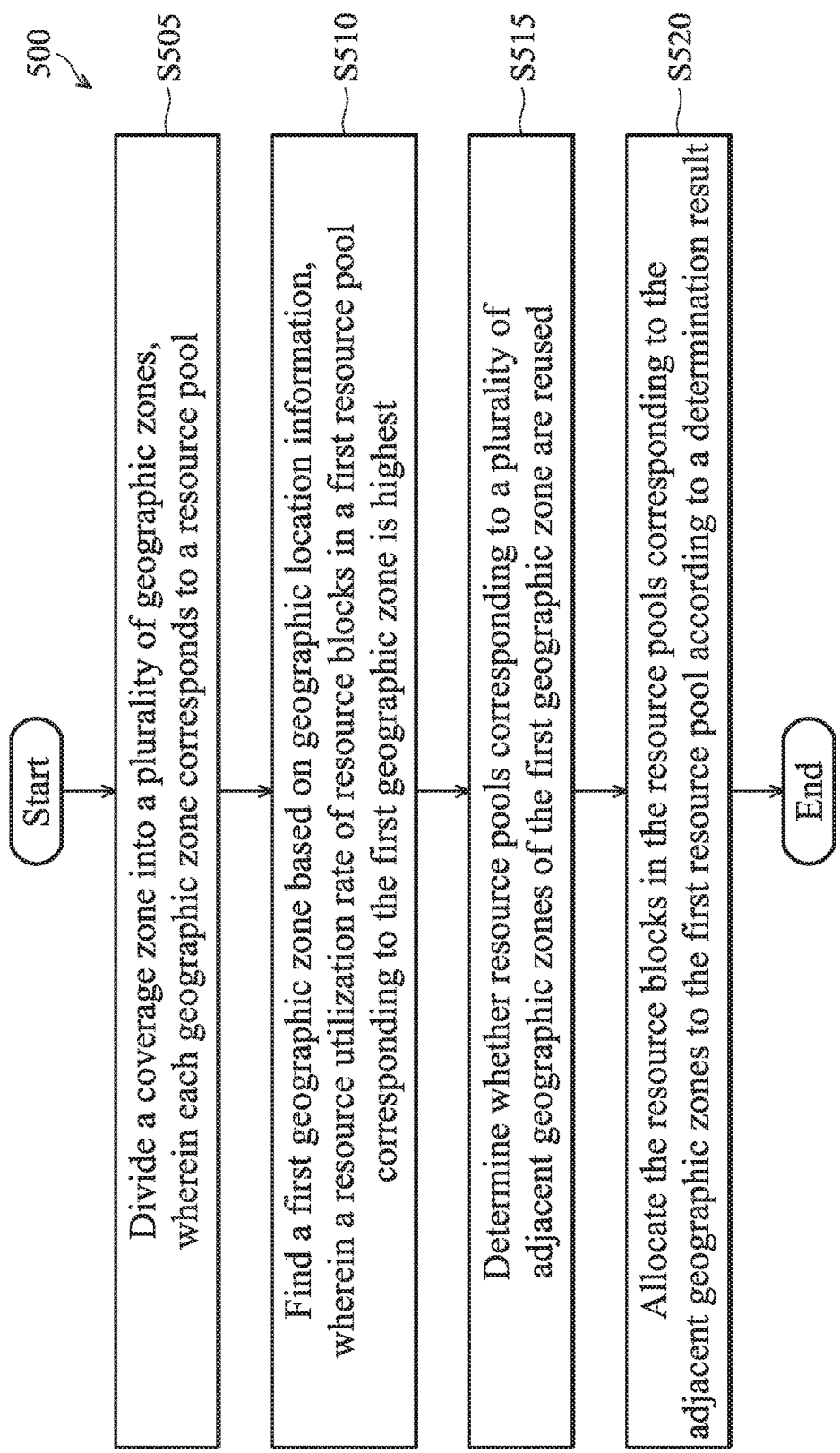
FIG. 5 is a flow chart illustrating a method for dynamically allocating resources in accordance with an embodiment of the present disclosure.

FIG. 5 is a flow chart 500 illustrating a method for dynamically allocating resources in accordance with an embodiment of the present disclosure. The method is used in a base station. In step S505, the base station dividing a coverage zone into a plurality of geographic zones, wherein each geographic zone corresponds to a resource pool. Next, in step S510, the base station finds a first geographic zone based on geographic location information, wherein a resource utilization rate of resource blocks in a first resource pool corresponding to the first geographic zone is highest. Then, in step S515, the base station determines whether resource pools corresponding to a plurality of adjacent geographic zones of the first geographic zone are reused. In step S520, the base station allocates the resource blocks in the resource pools corresponding to the adjacent geographic zones to the first resource pool according to a determination result.

In step S510 of FIG. 5, the geographic location information comprises at least one of the following:
 geographic locations and current geographic zones reported by a plurality of UEs in the coverage zone;
 a special time and place preset by the base station; for example, working hours, off hours, and certain intersections, etc;
 a particular message transmitted by a particular UE in the coverage zone, such as an ambulance or a user with a high priority.

In one embodiment, the base station may receive information reported by the UEs according to a preset period to dynamically update the geographic location information.

In the following paragraphs, some more detailed embodiments are described to illustrate how the base station allocates the resource blocks in the resource pools corresponding to the adjacent geographic zones to the first resource pool according to the determination result in step S520 of FIG. 5.

Allocating the resource blocks in the resource pools corresponding to the adjacent geographic zones may be performed in different manners for different determination results. The determination results can be divided into two cases:

Case 1: The resource pools corresponding to the adjacent geographic zones of the first geographic zone are not reused. In other words, the base station can independently adjust the resource blocks in the resource pools corresponding to the adjacent geographic areas.

Case 2: The resource pools corresponding to the adjacent geographic zones of the first geographic zone are reused. In other words, since some adjacent geographic zones share a common resource pool, the base station cannot independently adjust the resource blocks in the resource pools corresponding to the adjacent geographic zones.

Figure 6A:
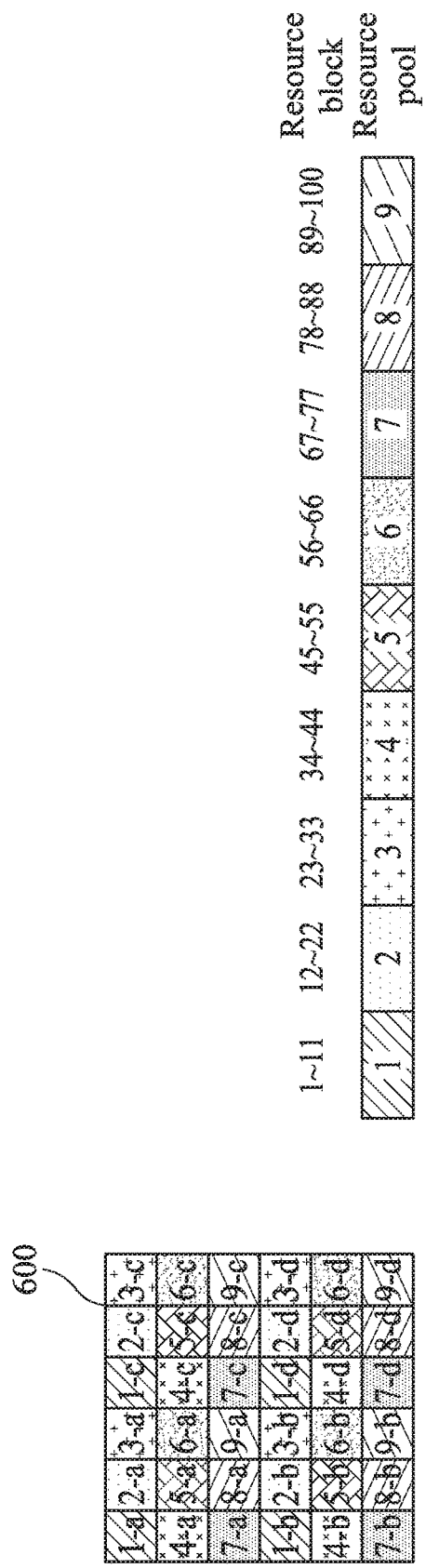
FIGS. 6A-6D are schematic diagrams of dynamically allocating resources in Case 1 in accordance with an embodiment of the present disclosure.

For Case 1, the base station may allocate resources in 3 different manners. FIGS. 6A-6D are schematic diagrams of dynamically allocating resources in Case 1 in accordance with an embodiment of the present disclosure. In FIG. 6A, it should be assumed that the total number of resource blocks is 100 and there are 9 resource pools. The base station divides a coverage zone 600 into a plurality of adjacent geographic zones, wherein each geographic zone corresponds to a resource pool. The geographic zones with the same zone ID share the same resource pool. For example, geographic zones 1-*a*, 1-*b*, 1-*c* and 1-*d* whose zone ID is "1" share the same resource pool 1, and geographic zones 2-*a*, 2-*b*, 2-*c* and 2-*d* whose zone ID is "2" share the same resource pool 2. As shown in FIG. 6A, the base station may have previously determined to allocate an average number of resource blocks to each resource pool, and may also allocate the same average number of resource blocks to each geographic zone. For example, the base station may allocate resource blocks 1 to 11 to geographic zones 1-*a*, 1-*b*, 1-*c* and 1-*d*, and allocate resource blocks 2 to 22 to geographic zones 2-*a*, 2-*b*, 2-*c* and 2-*d*.

When the base station finds a first geographic zone based on the geographic location information, wherein a resource utilization rate of resource blocks in the first resource pool corresponding to the first geographic zone is highest, the base station may allocate resources in the following different manners.

Manner 1

The base station finds a second geographic zone from the adjacent geographic zones of the first geographic zone based on the geographic location information, wherein a resource utilization rate of resource blocks in the second resource pool corresponding to the second geographic zone is lowest. The base station then allocates a portion of the resource blocks in the second resource pool to the first resource pool.

Figure 6B:
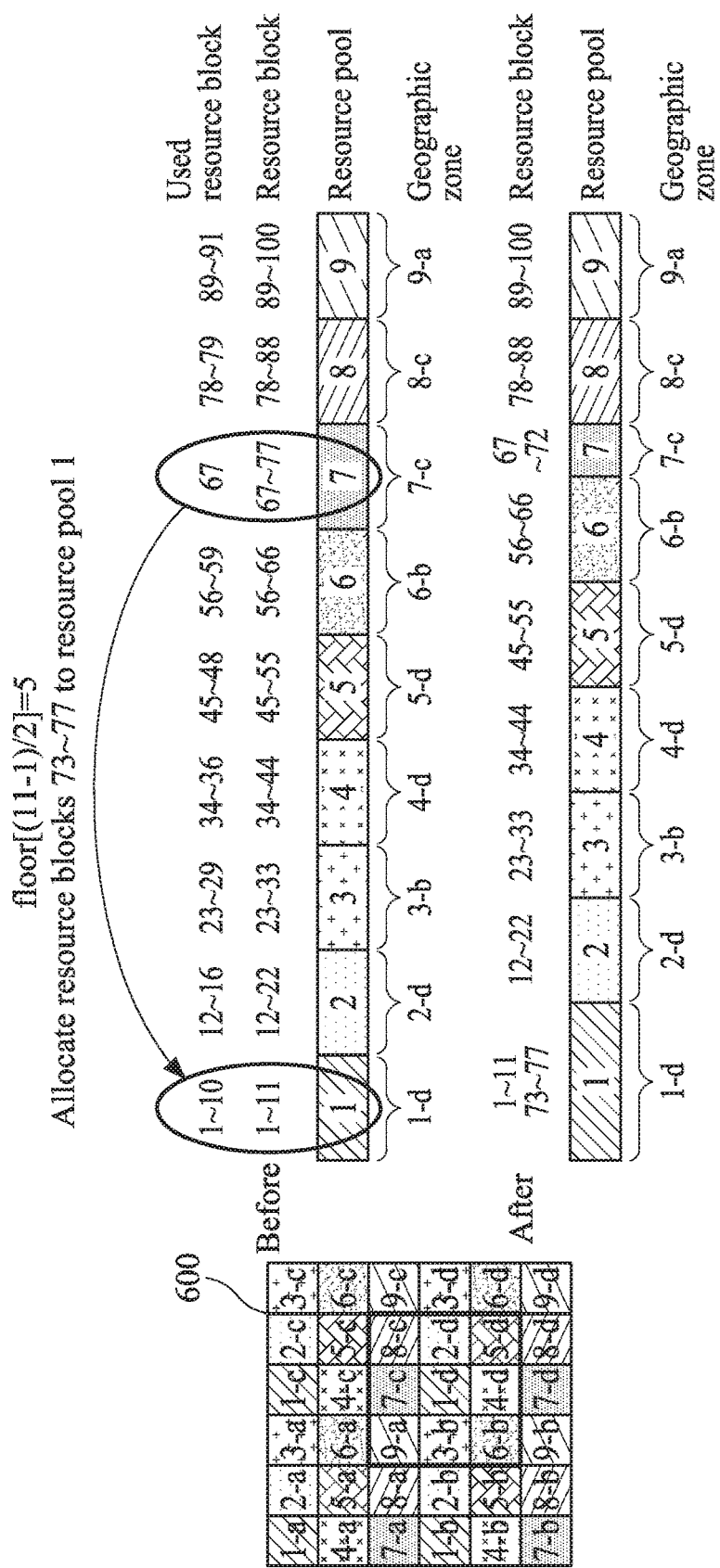

For example, it should be assumed that the base station finds that the first geographic zone is geographic zone 1-*d* based on the geographic location information, the base station finds a geographic zone 7-*c* from the adjacent geographic zones (9-*a*, 7-*c*, 8-*c*, 2-*d*. 5-*d*. 4-*d*. 6-*b*, 3-*b*) of geographic zone 1-*d* based on the geographic location information, wherein the resource blocks in resource pool 7 corresponding to geographic area 7-*c* have the lowest resource utilization rate. As shown in FIG. 6B, in resource pool 7 corresponding to geographic area 7-*c*, only one resource block 67 is used. Therefore, the base station may allocate a portion of the resource blocks in resource pool 7 to resource pool 1.

In this embodiment, the base station may allocate a portion of the resource blocks N in resource pool 7 to resource pool 1 according to a formula. The formula is as follows:

$N=\mathrm{floor}[(\text{the total number of resource blocks in the resource pool}-\text{the number of used resource blocks in the resource pool})/\text{a default parameter}]$ wherein the floor (x) is a function to round x down to an integer not more than x, and the default parameter is set by the base station. In the example, the default parameter is 2. It should be understood that the base station may have previously determined different default parameters, and it should not be limited to the disclosure. Accordingly, the base station may allocate N=5 resource blocks in resource pool 7 to resource pool 1 according to the formula. Therefore, the allocated resource pool 1 has resource blocks 1 to 11 and 73 to 77, and the allocated resource pool 7 has resource blocks 67 to 72.

Manner 2

The base station allocates a portion of the resource blocks in each resource pool corresponding to each adjacent geographic zone to the first resource pool.

Figure 6C:
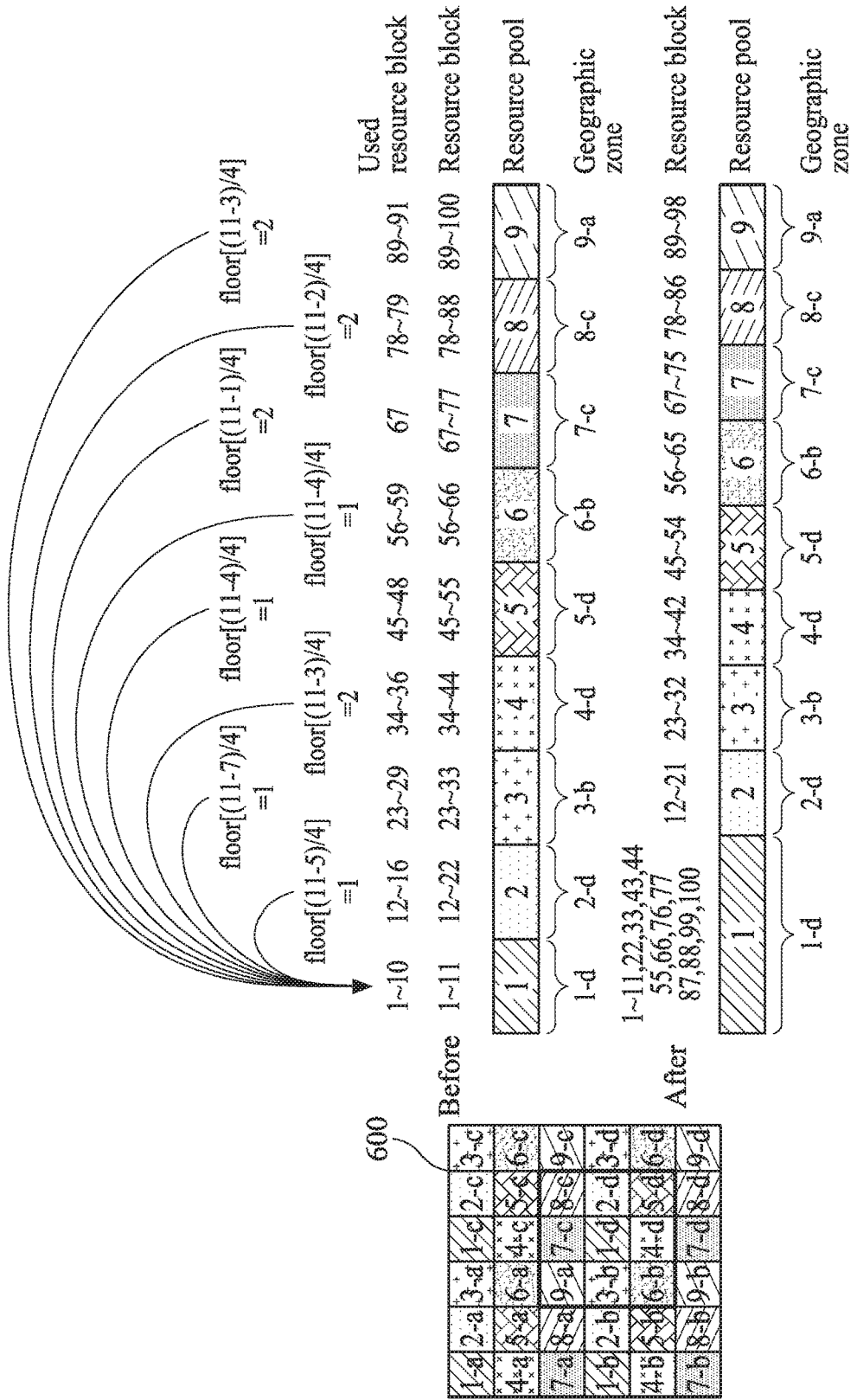

For example, it should be assumed that the base station finds that the first geographic zone is geographic zone 1-*d* based on the geographic location information, the base station allocates a portion of the resource blocks in each resource pool corresponding to each adjacent geographic zone (9-*a*, 7-*c*, 8-*c*. 2-*d*, 5-*d*, 4-*d*, 6-*b*, 3-*b*) to resource pool 1, as shown in FIG. 6C.

In this embodiment, the base station may allocate a portion of the resource blocks in each resource pool corresponding to each adjacent geographic zone (9-*a*, 7-*c*, 8-*c*, 2-*d*, 5-*d*, 4-*d*, 6-*b*, 3-*b*) to resource pool 1 according to a formula. The formula is as follows:

$$N=\text{floor}[(\text{the total number of resource blocks in the resource pool} - \text{the number of used resource blocks in the resource pool})/\text{a default parameter}]$$

wherein the floor (x) is a function to round x down to an integer not more than x, and the default parameter is set by the base station. In the example, the default parameter is 4. It should be understood that the base station may have previously determined different default parameters, and it should not be limited to the disclosure. Accordingly, the base station may allocate a portion of the resource blocks in each resource pool corresponding to each of the adjacent geographic zones (9-*a*, 7-*c*, 8-*c*, 2-*d*, 5-*d*, 4-*d*, 6-*b*, 3-*b*) to resource pool 1. Therefore, the allocated resource pool 1 has resource blocks 1 to 11, 22, 33, 43, 55, 66, 76, 77, 87, 88, 99 and 100.

Manner 3

The base station finds a second geographic zone from the adjacent geographic zones of the first geographic zone based on the geographic location information, wherein a resource utilization rate of resource blocks in the second resource pool corresponding to the second geographic zone is lowest. The base station then merges the second resource pool into the first resource pool.

Figure 6D:
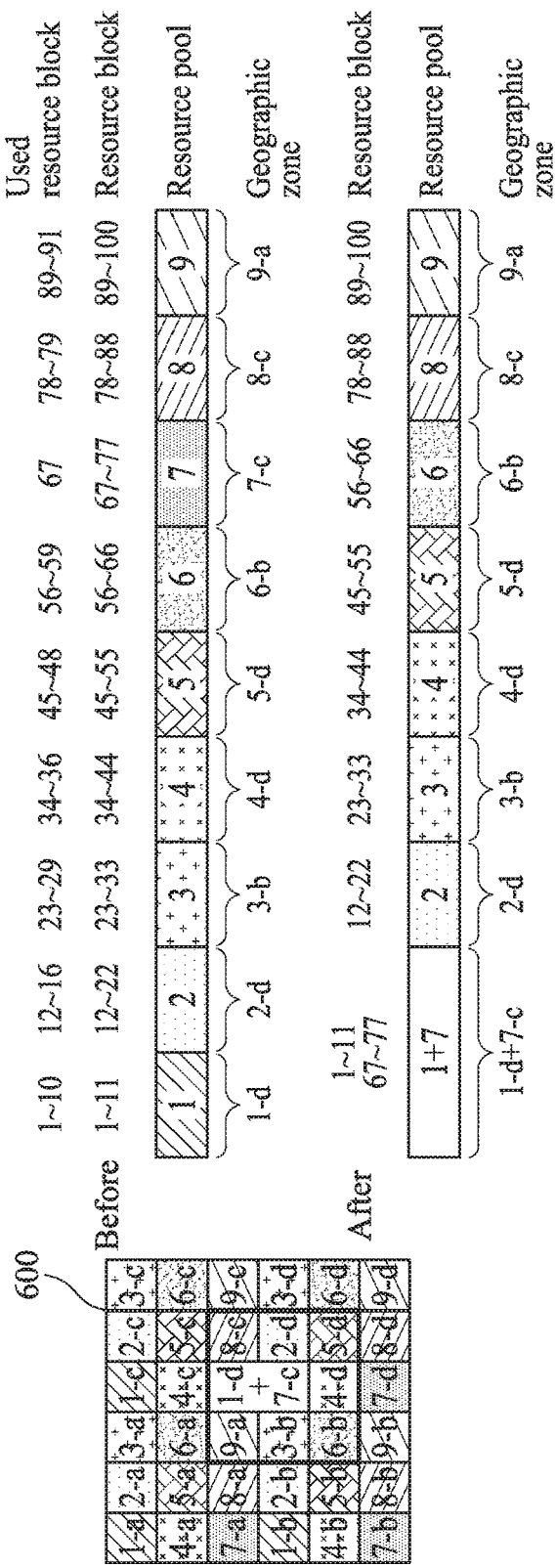

For example, it should be assumed that the base station finds that the first geographic zone is geographic zone 1-*d* based on the geographic location information, the base station finds a geographic zone 7-*c* from the adjacent geographic zones (9-*a*, 7-*c*, 8-*c*, 2-*d*, 5-*d*, 4-*d*, 6-*b*, 3-*b*) of geographic zone 1-*d* based on the geographic location information, wherein the resource blocks in resource pool 7 corresponding to geographic area 7-*c* have the lowest resource utilization rate. As shown in FIG. 6D, in resource pool 7 corresponding to geographic area 7-*c*, only one resource block 67 is used. Therefore, the base station may merge resource pool 7 into resource pool 1. The merged resource pool 7 and resource pool 1 have resource blocks 1 to 11, 22, 33, 43, 55, 66, 76, 77, 87, 88, 99 and 100.

Figure 7A:
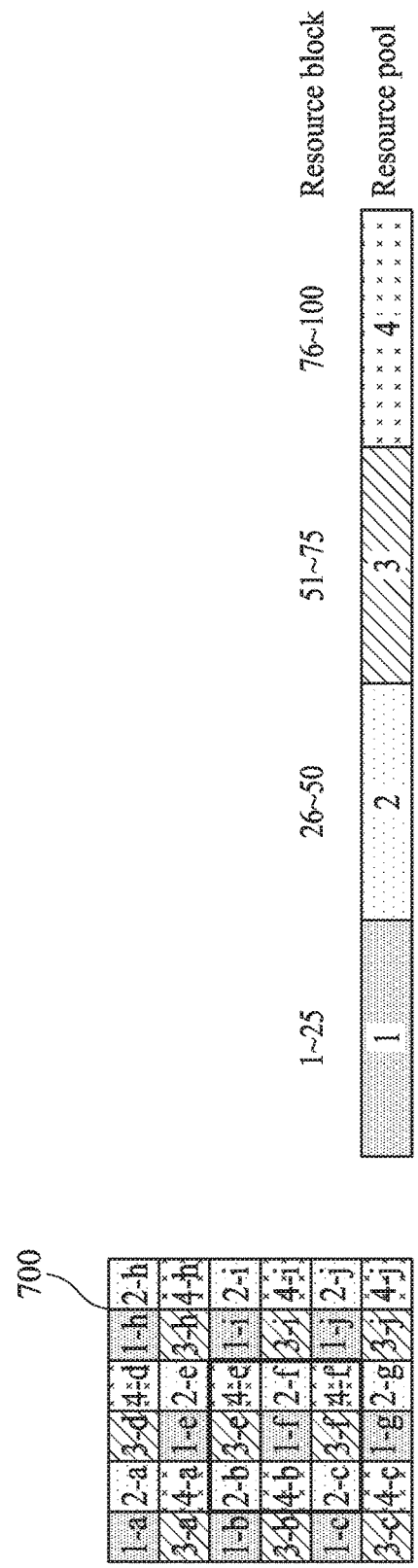
FIGS. 7A to 7D are schematic diagrams of dynamically allocating resources in Case 2 in accordance with an embodiment of the present disclosure.

For Case 2, the base station can allocate resources in two different manners. FIGS. 7A to 7D are schematic diagrams of dynamically allocating resources in Case 2 in accordance with an embodiment of the present disclosure. In FIG. 7A, it should be assumed that the total number of resource blocks is 100 and there are 4 resource pools. The base station divides a coverage zone 700 into a plurality of adjacent geographic zones, wherein each geographic zone corresponds to a resource pool. The geographic zones with the same zone ID share the same resource pool. For example, geographic zones 1-*a*. 1-*b*, 1-*c*, 1-*d*, 1-*e*, 1-*f*, 1-*g*, 1-*h*, 1-*i* and 1-*j* whose zone ID is "1" share the same resource pool 1, and the geographic zones 2-*a*. 2-*b*, 2-*c*, 2-*d*. 2-*e*, 2-*f*, 2-*g*. 2-*h*, 2-*i* and 2-*j* whose zone ID is "2" share the same resource pool 2. As shown in FIG. 7A, the base station may have previously determined to allocate an average number of resource blocks to each resource pool, and may also allocate the same average number of resource blocks to each geographic zone. For example, the base station may allocate resource blocks 1 to 25 to geographic zones 1-*a*, 1-*b*, 1-*c*. 1-*d*, 1-*e*. 1-*f*. 1-*g*, 1-*h*, 1-*i* and 1-*j*, and allocate resource blocks 26 to 50 to geographic zones 2-*a*, 2-*b*, 2-*c*. 2-*d*, 2-*e*, 2-*f*, 2-*g*, 2-*h*, 2-*i*, 2-*j*.

When the base station finds a first geographic zone based on the geographic location information, wherein a resource utilization rate of resource blocks in the first resource pool corresponding to the first geographic zone is highest, the base station may allocate resources in the following different manners.

Manner 1

The base station finds all the geographic zones corresponding to a third geographic zone from the adjacent geographic zones of the first geographic zone based on the geographic location information, wherein a resource utilization rate of resource blocks in the third resource pool is lowest. The base station then allocates a portion of the resource blocks in the third resource pool to the first resource pool.

Figure 7B:
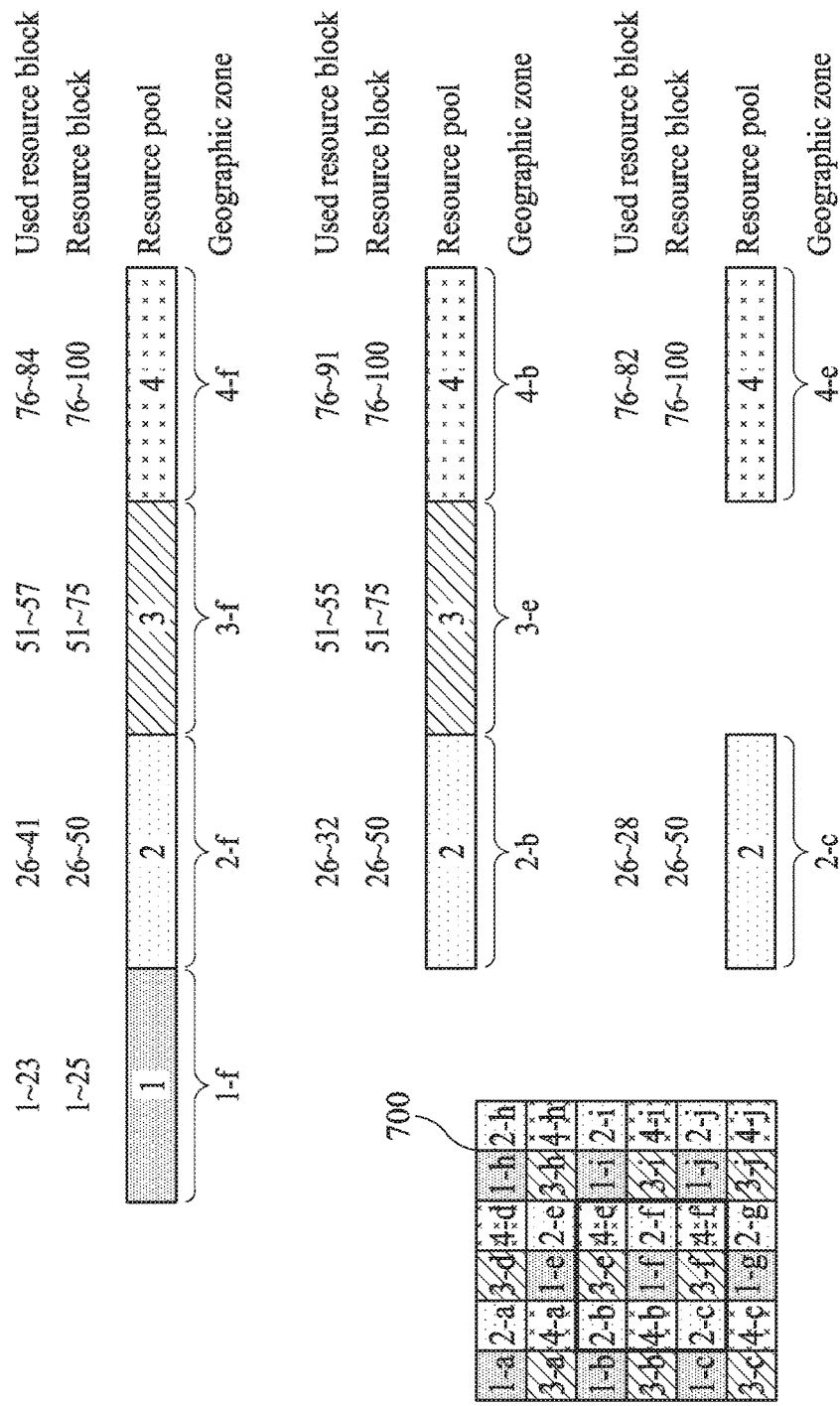
Figure 7C:
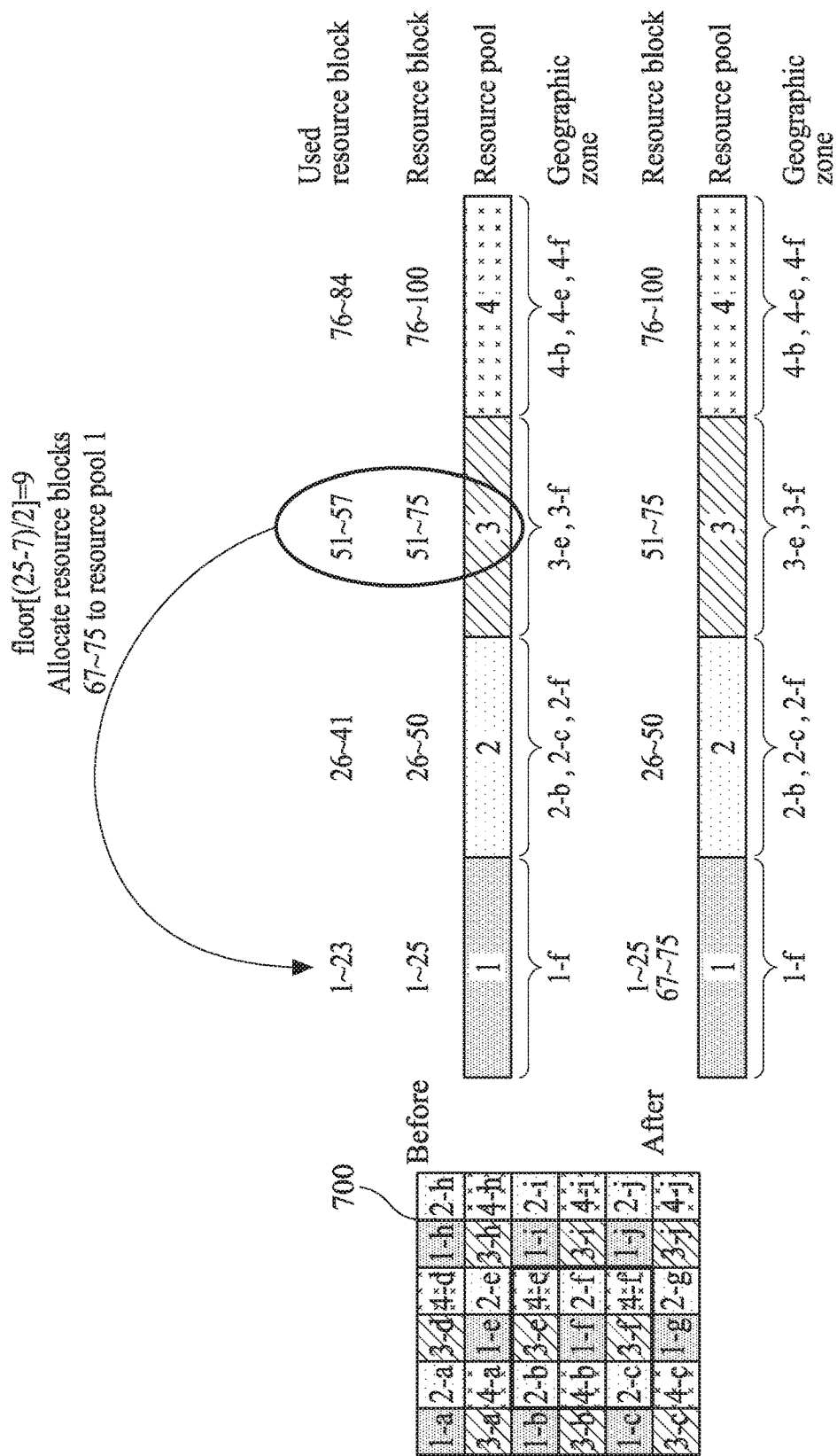

For example, the illustration of how each geographic zone uses the resource blocks in the resource pool can be referred to FIG. 7B. It should be assumed that the base station finds that the first geographic zone is geographic zone 1-*f* based on the geographic location information, the base station finds all geographic zones corresponding to resource pool 3 from the adjacent geographic zones (2-*b*. 2-*c*, 2-*f*, 3-*e*, 3-*f*, 4-*b*, 4-*e*. 4-*f*) of geographic zone 1-*f* according to the geographic location information, wherein a resource utilization rate of resource blocks in resource pool 3 is lowest. As shown in FIG. 7B, geographic zone 3-*f* and geographic zone 3-*e* merely use resource blocks 51 to 57 and 51 to 55 in resource pool 3, respectively. Since the resource utilization rate of resource blocks in resource pool 3 corresponding to geographic zones 3-*f* and 3-*e* is lowest, the base station may allocate a portion of the resource blocks in resource pool 3 to resource pool 1, as shown in FIG. 7C.

In this embodiment, the base station may allocate a portion of the resource blocks N in resource pool 3 to resource pool 1 according to a formula. The formula is as follows:

$$N=\text{floor}[(\text{the total number of resource blocks in the resource pool} - \text{the number of used resource blocks in the resource pool})/\text{a default parameter}]$$

wherein the floor (x) is a function to round x down to an integer not more than x, and the default parameter is set by the base station. In the example, the default parameter is 2. It should be understood that the base station may have previously determined different default parameters, and it should not be limited to the disclosure. Accordingly, the base station may allocate N=9 resource blocks in resource pool 3 to resource pool 1. Therefore, the allocated resource pool 1 has resource blocks 1 to 25 and 67 to 75, and the allocated resource pool 3 has resource blocks 51 to 66.

Manner 2

The base station allocates a portion of the resource blocks in each resource pool corresponding to each adjacent geographic zone to the first resource pool.

Figure 7D:
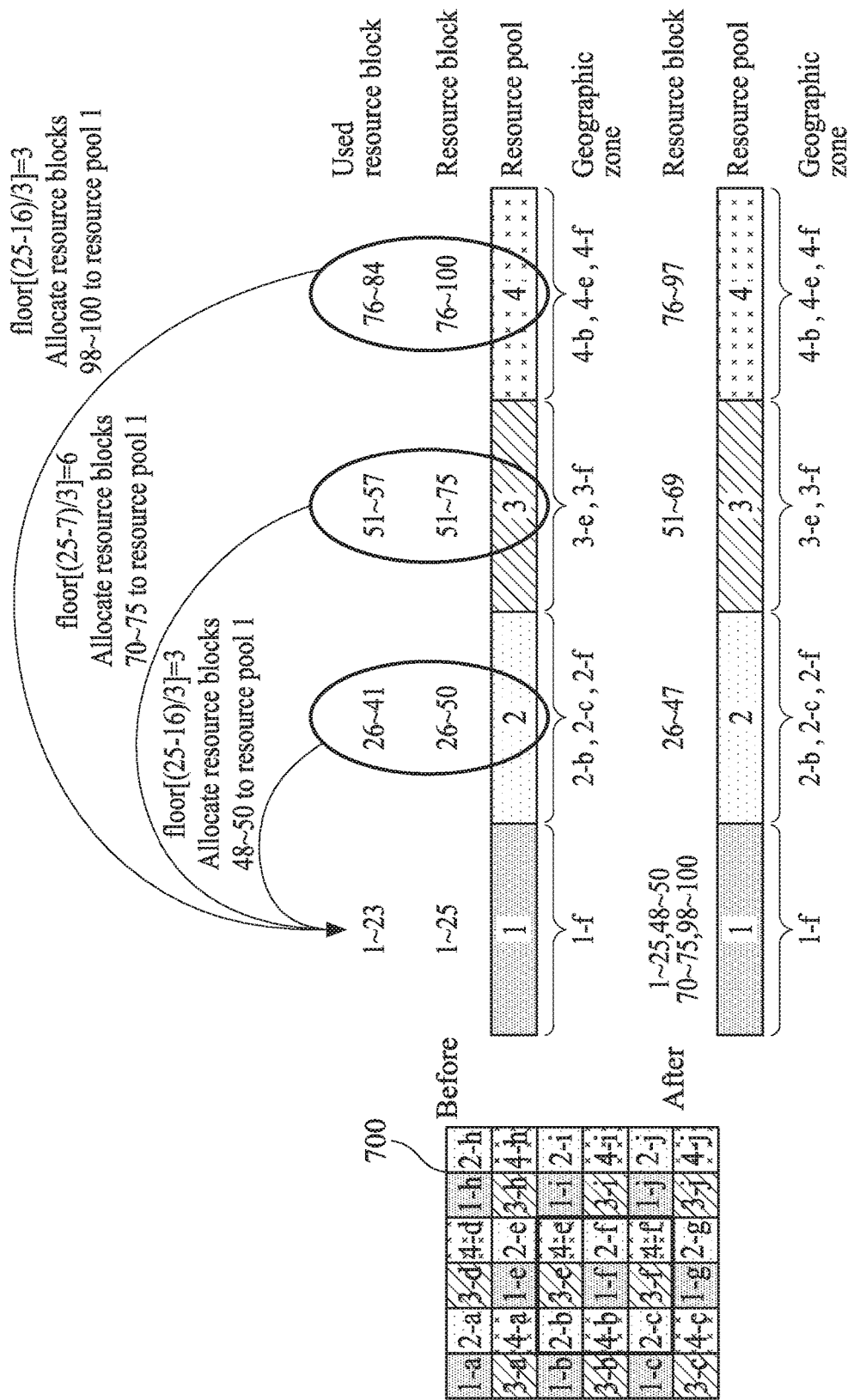

For example, the illustration of how each geographic zone uses the resource blocks in the resource pool can be referred to FIG. 7B. It should be assumed that the base station finds that the first geographic zone is geographic zone 1-*f* based on the geographic location information, the base station allocates a portion of the resource blocks in each resource pool corresponding to each of the adjacent geographic zones (2-*b*, 2-*c*, 2-*f*, 3-*e*, 3-*f*, 4-*b*, 4-*e*, 4-*f*) of geographic zone 1-*f* to resource pool 1, as shown in FIG. 7D.

In this embodiment, the base station may allocate a portion of the resource blocks in each resource pool corresponding to each adjacent geographic zone (2-*b*, 2-*c*, 2-*f*, 3-*e*, 3-*f*, 4-*b*, 4-*e*, 4-*f*) to resource pool 1 according to a formula. The formula is as follows:

$$N=\text{floor}[(\text{the total number of resource blocks in the resource pool} - \text{the number of used resource blocks in the resource pool})/\text{a default parameter}]$$

wherein the floor (x) is a function to round x down to an integer not more than x, and the default parameter is set by the base station. In the example, the default parameter is 3. It should be understood that the base station may have previously determined different default parameters, and it should not be limited to the disclosure. Accordingly, the base station may allocate a portion of the resource blocks in each resource pool corresponding to each adjacent geographic zone (2-*b*, 2-*c*, 2-*f*, 3-*e*, 3-*f*, 4-*b*, 4-*e*, 4-*f*) to resource pool 1. Therefore, as shown in FIG. 7C, the allocated resource pool 1 has resource blocks 1 to 25, 48 to 50, 70 to 75 and 98 to 100. The allocated resource pool 2 corresponding to geographic zones 2-*b*, 2-*c* and 2-*f* has resource blocks 26 to 47. The allocated resource pool 3 corresponding to geographic zones 3-*f* and 3-*e* has resource blocks 51 to 69. The allocated resource pool 4 corresponding to geographic zones 4-*b*, 4-*e* and 4-*f* has resource blocks 76 to 97.

One resource block (namely, physical resource block (PRB)) is defined over a rectangular 2-D frequency-time resource area, covering 12 contiguous subcarriers over the frequency domain and 1 subframe over the time domain. In addition, each subframe can also contain two equal-length slots, with each slot containing 7 orthogonal frequency division multiplexing (OFDM) symbols. Therefore, after the base station allocates the resource blocks of the resource pools, the base station can broadcast the resource blocks in the resource pool which has been allocated to all UEs in the coverage zone through the OFDM symbols.

In addition, the central processing unit 208 can execute the program code 212 to perform all of the actions and steps described above or others described herein.

Therefore, the base station can dynamically allocate the resources of the resource pool in a coverage zone through a method for dynamically allocating resources provided in the present disclosure, so that the efficiency of allocating resources at network sides can be improved further.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application-specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for dynamically allocating resources, used in a base station, comprising:
    dividing a coverage zone into a plurality of geographic zones, wherein each geographic zone corresponds to a resource pool and each geographic zone does not share the same resource pool with respective adjacent geographic zones;
    finding a first geographic zone based on geographic location information, wherein a resource utilization rate of resource blocks in a first resource pool corresponding to the first geographic zone is highest;
    determining whether resource pools corresponding to a plurality of adjacent geographic zones of the first geographic zone are reused; and
    allocating the resource blocks in the resource pools corresponding to the adjacent geographic zones to the first resource pool according to a determination result.

2. The method for dynamically allocating resources as claimed in claim 1, wherein when the determination result indicates that the resource pools corresponding to the adjacent geographic zones of the first geographic zone are not reused, the step of allocating the resource blocks further comprises:
    finding a second geographic zone from the adjacent geographic zones according to the geographic location information, wherein a resource utilization rate of resource blocks in a second resource pool corresponding to the second geographic zone is lowest; and
    allocating a portion of the resource blocks in the second resource pool to the first resource pool.

3. The method for dynamically allocating resources as claimed in claim 1, wherein when the determination result indicates that the resource pools corresponding to the adjacent geographic zones of the first geographic zone are not reused, the step of allocating the resource blocks further comprises:
    allocating a portion of the resource blocks in each resource pool corresponding to the adjacent geographic zones to the first resource pool.

4. The method for dynamically allocating resources as claimed in claim 1, wherein when the determination result indicates that the resource pools corresponding to the adjacent geographic zones of the first geographic zone are not reused, the step of allocating the resource blocks further comprises:
    finding a second geographic zone from the adjacent geographic zones according to the geographic location information, wherein a resource utilization rate of resource blocks in a second resource pool corresponding to the second geographic zone is lowest; and
    merging the second resource pool into the first resource pool.

5. The method for dynamically allocating resources as claimed in claim 1, wherein when the determination result indicates that the resource pools corresponding to the adjacent geographic zones of the first geographic zone are reused, the step of allocating the resource blocks further comprises:
    finding all geographic zones corresponding to a third resource pool from the adjacent geographic zones according to the geographic location information, wherein a resource utilization rate of resource blocks in the third resource pool is lowest; and
    allocating a portion of the resource blocks in the third resource pool to the first resource pool.

6. The method for dynamically allocating resources as claimed in claim 1, wherein when the determination result indicates that the resource pools corresponding to the adjacent geographic zones of the first geographic zone are reused, the step of allocating the resource blocks further comprises:
    allocating a portion of the resource blocks in each resource pool corresponding to the adjacent geographic zones to the first resource pool.

7. The method for dynamically allocating resources as claimed in claim 1, wherein the geographic location information comprises at least one of the following:
    geographic locations and current geographic zones reported by a plurality of user equipments (UEs) in the coverage zone;
    a special time and place preset by the base station; and
    a particular message transmitted by a particular UE in the coverage zone.

8. The method for dynamically allocating resources as claimed in claim 1, wherein each geographic zone has a respective length and width.

9. A communications device for dynamically allocating resources, comprising:
    a control circuit;
    a processor installed in the control circuit;
    a memory installed in the control circuit and operatively coupled to the processor;
    wherein the processor is configured to execute program code stored in the memory to perform operations comprising:
    dividing a coverage zone into a plurality of geographic zones, wherein each geographic zone corresponds to a resource pool and each geographic zone does not share the same resource pool with respective adjacent geographic zones;
    finding a first geographic zone based on geographic location information, wherein a resource utilization rate of resource blocks in a first resource pool corresponding to the first geographic zone is highest;
    determining whether resource pools corresponding to a plurality of adjacent geographic zones of the first geographic zone are reused; and
    allocating the resource blocks in the resource pools corresponding to the adjacent geographic zones to the first resource pool according to a determination result.

10. The communications device for dynamically allocating resources as claimed in claim 9, wherein when the determination result indicates that the resource pools corresponding to the adjacent geographic zones of the first geographic zone are not reused, the processor further executes the program code to perform operations comprising:
    finding a second geographic zone from the adjacent geographic zones according to the geographic location information, wherein a resource utilization rate of resource blocks in a second resource pool corresponding to the second geographic zone is lowest; and allocating a portion of the resource blocks in the second resource pool to the first resource pool.

11. The communications device for dynamically allocating resources as claimed in claim 9, wherein when the determination result indicates that the resource pools corresponding to the adjacent geographic zones of the first geographic zone are not reused, the processor further executes the program code to perform operations comprising:
- allocating a portion of the resource blocks in each resource pool corresponding to the adjacent geographic zones to the first resource pool.

12. The communications device for dynamically allocating resources as claimed in claim 9, wherein when the determination result indicates that the resource pools corresponding to the adjacent geographic zones of the first geographic zone are not reused, the processor further executes the program code to perform operations comprising:
- finding a second geographic zone from the adjacent geographic zones according to the geographic location information, wherein a resource utilization rate of resource blocks in a second resource pool corresponding to the second geographic zone is lowest; and
- merging the second resource pool into the first resource pool.

13. The communications device for dynamically allocating resources as claimed in claim 9, wherein when the determination result indicates that the resource pools corresponding to the adjacent geographic zones of the first geographic zone are reused, the processor further executes the program code to perform operations comprising:
- finding all geographic zones corresponding to a third resource pool from the adjacent geographic zones according to the geographic location information, wherein a resource utilization rate of resource blocks in the third resource pool is lowest; and
- allocating a portion of the resource blocks in the third resource pool to the first resource pool.

14. The communications device for dynamically allocating resources as claimed in claim 9, wherein when the determination result indicates that the resource pools corresponding to the adjacent geographic zones of the first geographic zone are reused, the processor further executes the program code to perform operations comprising:
- allocating a portion of the resource blocks in each resource pool corresponding to the adjacent geographic zones to the first resource pool.

15. The communications device for dynamically allocating resources as claimed in claim 9, wherein the geographic location information comprises at least one of the following:
- geographic locations and current geographic zones reported by a plurality of user equipments (UEs) in the coverage zone;
- a special time and place preset by the base station; and
- a particular message transmitted by a particular UE in the coverage zone.

16. The communications device for dynamically allocating resources as claimed in claim 9, wherein each geographic zone has a respective length and width.

\* \* \* \* \*